United States Patent [19]

Mori et al.

[11] 4,060,573
[45] Nov. 29, 1977

[54] CARBURETOR ASSEMBLY

[75] Inventors: Michitsugu Mori; Mitsuo Ohfuji, both of Katsuta; Akiyasu Kuwahara, Hitachi, all of Japan

[73] Assignee: Hitachi, Ltd., Japan

[21] Appl. No.: 729,701

[22] Filed: Oct. 5, 1976

Related U.S. Application Data

[63] Continuation-in-part of Ser. No. 562,395, March 27, 1975, abandoned.

[30] Foreign Application Priority Data

Mar. 29, 1974 Japan .................................. 49-34478

[51] Int. Cl.$^2$ ..................... F02M 13/04; F02B 19/10
[52] U.S. Cl. ............................. 261/23 B; 261/41 D; 261/DIG. 50; 123/32 ST
[58] Field of Search ............. 261/23 A, 121 A, 41 D, 261/DIG. 50, 23 B; 123/32 ST, 127, 75 B

[56] References Cited

U.S. PATENT DOCUMENTS

| 2,323,222 | 6/1943 | Holley et al. | 261/23 A |
| 2,687,710 | 8/1954 | Rauen | 261/41 D |
| 2,757,914 | 8/1956 | Ball | 261/DIG. 50 |
| 2,868,185 | 1/1959 | Bellicardi | 261/39 D |
| 3,317,196 | 5/1967 | Smith | 123/127 |
| 3,570,821 | 3/1971 | Walker | 261/23 A |
| 3,842,810 | 10/1974 | Yagi et al. | 261/23 A |

Primary Examiner—Tim R. Miles
Attorney, Agent, or Firm—Craig & Antonelli

[57] ABSTRACT

A carburetor assembly for stratified charge combustion type engines wherein a rich set carburetor and a lean set carburetor are arranged such that a substantially straight line connects together the centers of an inlet bore of the rich set carburetor and inlet bores of a primary side carburetor and a secondary side carburetor of the lean set carburetor as seen from above. The rich set carburetor is disposed adjacent the primary side carburetor of the lean set carburetor and formed integrally therewith. A float chamber is arranged such that the center of its inclination is disposed in the vicinity of the center line between the main fuel nozzles of the primary side carburetor and the secondary side carburetor. An open end of the main fuel nozzle of the rich set carburetor is disposed at a level higher than open ends of the main fuel nozzles of the primary side carburetor and the secondary side carburetor of the lean set carburetor.

3 Claims, 3 Drawing Figures

F I G. 1
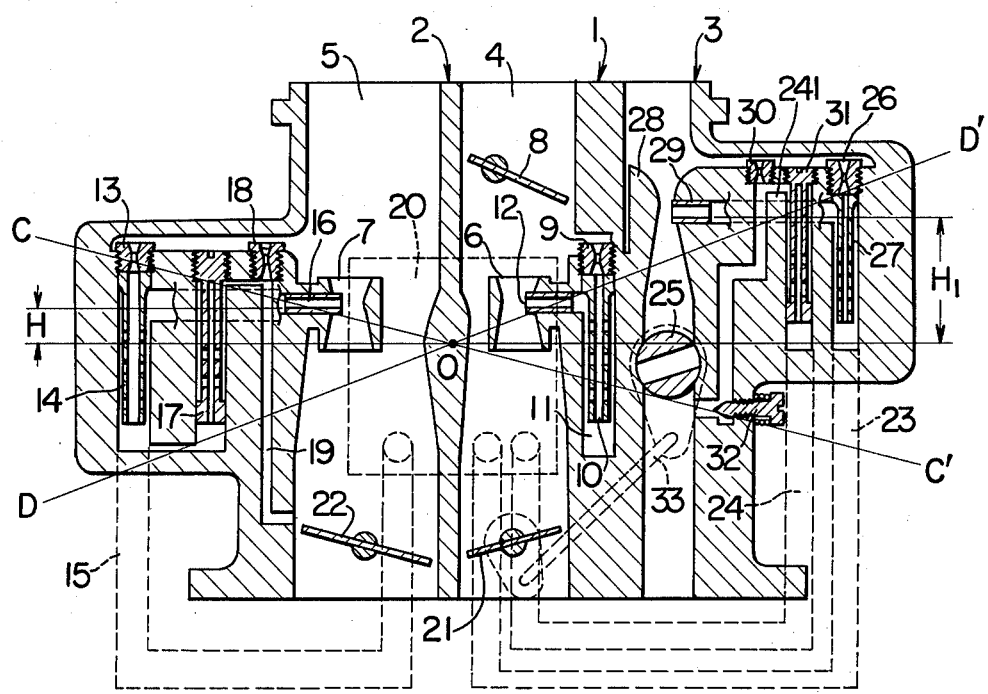

CARBURETOR ASSEMBLY

CROSS REFERENCE TO THE RELATED APPLICATION

This is a continuation-in-Part of U.S. Ser. No. 562,395 filed on Mar. 27, 1975, now abandoned.

BACKGROUND OF THE INVENTION

1. Field of the Invention

This invention relates to a carburetor assembly comprising a rich set carburetor for supplying rich fuel-air mixtures and a lean set carburetor for supplying lean fuel-air mixtures and adapted for use with an internal combustion engine of the so-called stratified charge combustion type wherein a rich mixture section and a lean mixture section are formed in a combustion chamber, and wherein a flame of combustion produced by igniting the rich fuel-air mixture in the rich mixture section is used to ignite and burn the lean fuel-air mixture in the lean mixture section.

2. Description of the Prior Art

Generally, internal combustion engines of the startified charge combustion type are capable of reducing the amounts of oxides of nitrogen, carbon monoxide and hydrocarbons in the exhaust gases by increasing the leanness of the fuel-air mixture drawn by suction into the engine as a whole. One example of this type of engine which has been proposed is an internal combustion engine of the torch ignition type comprising a main combustion chamber section receiving a supply of lean fuel-air mixtures, and an auxiliary combustion chamber section maintained in communication with the main combustion chamber section through a torch opening and adapted to receive a supply of rich fuel-air mixtures. In an internal combustion engine of the torch ignition type, a flame of combustion produced in the auxiliary combustion chamber section is ejected through the torch opening into the main combustion chamber section so as to ignite and burn the lean fuel-air mixture in the main combustion chamber section.

The internal combustion engine of the torch ignition type constructed as aforesaid is provided with a rich set carburetor for supplying rich fuel-air mixtures to the auxiliary combustion chamber section, and a lean set carburetor having a primary side carburator and a secondary side carburetor for supplying lean fuel-air mixtures to the main combustion chamber section. Preferably, they are formed integrally with each other and receive a supply of fuel from a single float chamber. This is because the arrangement enables minimization of the problems which might be raised in connection with the layout of the engine and the accumulated errors of links and the like which determine the relative positions of the rich and lean set carburetors. Also, it is in order to reduce the number of component parts and simplify the construction of the carburetor assembly as a whole that a single float chamber is shared by the two carburetors. One of the problems raised in designing such carburetor assembly is how to cope with variations in the inclination of a fuel surface in the float chamber.

Generally, it is known that the types and amounts of noxious components of the exhaust emission of an internal combustion engine of the torch type depend on the performance of the main combustion chamber of the torch ignition type. More, specifically, since the main combustion chamber section has a volume which is much greater than the volume of the auxiliary combustion chamber section, the flow of fuel to the main combustion chamber section per one cycle is much greater in volume than the flow of fuel to the auxiliary combustion chamber section, no matter how thin the fuel-air mixture supplied to the main combustion chamber section may be. This makes it necessary to effect control, with a high degree of precision, of the ratio of the two flows to be mixed with each other (volume of air/volume of fuel). In an engine mounted on a motor vehicle, the fuel surface in the float chamber of the carburetor will be inclined due to the fact that the motor vehicle must take a short turn or accelerate or decelerate suddenly in view of the purposes it is intended to serve. This will cause variations in the air-fuel ratio of the mixtures supplied to the engine. It will thus be appreciated that it is essential to arrange the float chamber substantially in the vicinity of the center of the lean set carburetor so as to thereby minimize the influences of the tilting of the motor vehicle.

However, this arrangement is not without a disadvantage. That is, when the motor vehicle takes a short turn or decelerates or accelerates suddenly, the fuel-air mixture supplied to the rich set carburetor will be influenced by inclination of the fuel level in the float chamber and its richness will be increased. If this phenomenon occurs, the ignition plug disposed in the auxiliary combustion chamber section will get wet and become unable to produce a flame in the auxiliary combustion chamber section. As a result, the fuel-air mixture in the main combustion chamber section will not burn, thereby causing an increase in the amounts of noxious components of the exhaust gases, particularly those of hydrocarbons. This is not desirable from the point of view of controlling exhaust emissions of motor vehicles.

Another solution of the problem of how to eliminate the influences of the inclined fuel level that comes to mind would be to arrange main nozzles of the lean and rich set carburetors at positions which are at a higher level than the positions in which they have hitherto been disposed (if this is the case, the float chamber may be disposed in any position as desired). However, this arrangement would cause the trouble of the fuel flow lagging behind the air flow and would make it impossible to supply the engine with mixtures of the proportions of fuel and air which meet the requirements of the engine. More specifically, if the air bleed and the fuel jet of the prior art are employed without any alteration, there will be a delay in the fuel flow which corresponds to the increase in the height of the main nozzles. If the design of the air bleed, the fuel jet and the diameter of the Venturi were altered to eliminate the delay in the fuel flow, the air-fuel ratios of the mixtures and the volumes of air supplied to the engine would be unable to meet the requirements of the engine. Particularly, unless the mixture supplied to the main combustion chamber is controlled with a high degree of precision as aforementioned, it will be difficult to effect exhaust emission control satisfactorily.

SUMMARY OF THE INVENTION

This invention has as its object the provision of a carburetor assembly for stratified charge combustion type engines wherein the influences exerted on the rich set carburetor and the lean set carburetor by the inclined fuel surface in the float chamber are minimized, so that mixtures of proper proportions of fuel and air can be supplied to the engine.

The outstanding characteristics of the invention will be summarized. According to the invention, the carburetor assembly has a lean set carburetor and a rich set carburetor which are arranged such that a substantially straight line connects together the center of each inlet bore of the primary side carburetor and secondary side carburetor of the lean set carburetor and the rich set carburetor as seen from above. The rich set carburetor is disposed adjacent the primary side carburetor of the lean set carburetor and formed integrally therewith. The float chamber is arranged such that the center of its inclination is disposed in the vicinity of the center line between the main fuel nozzles of the primary side carburetor and the secondary side carburetor. An open end of the main fuel nozzle of the rich set carburetor is disposed at a level higher than open ends of the main fuel nozzles of the primary side carburetor and the secondary side carburetor of the lean set carburetor.

BRIEF DESCRIPTION OF THE DRAWINGS

FIG. 1 is a vertical sectional view of the essential portions of the carburetor assembly comprising one embodiment of the present invention;

DESCRIPTION OF EMBODIMENTS

Figure 2:
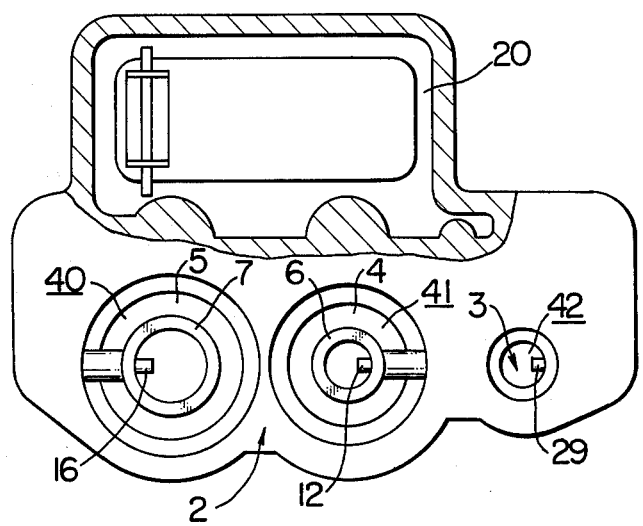
FIG. 2 is a plan view of the carburetor assembly shown in FIG. 1 with a partial section.

The invention will now be described with reference to the embodiments shown in the drawings. 1 designates a carburetor assembly comprising a lean set carburetor 2 and a rich set carburetor 3. The lean set carburetor 2 which is a duplex type has a primary side carburetor 4 and a secondary side carburetor 5 provided with a primary Venturi 6 and a secondary Venturi 7 respectively. In the primary side carburetor 4, there are mounted a choke valve 8, a primary main fuel passageway 11 including a main air bleed 9 and an emulsion tube 10, a primary main fuel nozzle 12, and a low speed system consisting of an idling adjusting screw and other parts (not shown). In the secondary side carburetor 5, there are mounted a secondary main fuel passageway 15 including a main air bleed 13 and an emulsion tube 14, a secondary main fuel nozzle 16, and a step passageway 19 branching off the secondary main fuel passageway 15 and including a step jet 17 and a step air bleed 18. The primary main fuel passageway 11, low speed system (not shown), secondary main fuel passageway 15 and step passageway 19 are maintained in communication with a float chamber 20 shown in broken lines.

The float chamber 20 contains therein a fuel which is maintained at a substantially constant fuel level by float means. As can be seen in FIG. 1, the float chamber 20 is arranged such that it is disposed near the center of the lean set carburetor 2. More specifically, the float chamber 20 is arranged such that the center of its inclination substantially coincides with the center line between the primary main fuel nozzle 12 and secondary main fuel nozzle 16, and the primary main fuel nozzle 12 and secondary main fuel nozzle 16 have a head H with respect to the fuel level in the float chamber 20.

The fuel-air mixtures in the lean set carburetor 2 are controlled by a primary throttle valve 21 and a secondary throttle valve 22. The two throttle valves are constructed such that the secondary throttle valve 22 opens after the degree of opening of the primary throttle valve 21 has reached a predetermined level.

The construction of the rich set carburetor 3 will now be described. The rich set carburetor 3 is arranged with respect to the primay side carburetor 4 and the secondary side carburetor 5 of the lean set carburetor 2 such that a substantially straight line connects together the centers of inlet bores 40, 41 and 42 of the carburetors 5, 4 and 3 as seen from above (see FIG. 2). Also, the rich set carburetor 3 is formed integrally with the lean set carburetor 2 and disposed adjacent the primary side carburetor 2. These arrangements serve to simplify the interlocking mechanism of throttle valves 21 and 25 of the carburetors 4 and 3. The rich set carburetor 3 comprises a rich main fuel passageway 23, a rich low speed fuel passageway 24 and a rich throttle valve 25. The rich main fuel passageway 23 which includes a main air bleed 26 and an emulsion tube 27 opens at one end in the float chamber 20 and at the other end in a Venturi 28 through a rich main fuel nozzle 29. The rich low speed fuel passageway 24 which includes a low speed air bleed 30 and a low speed jet 31 opens at one end in the float chamber 20 and at the other end at the downstream side of the rich throttle valve 25.

An idling adjusting screw 32 is provided in the rich low speed fuel passageway 24 for adjusting the fuel flow at idling. The rich throttle valve 25 is connected by a rod 33 to the adjacent primary throttle valve 21, so that the rich throttle valve 25 will be displaced in accordance with the displacement of the primary throttle valve 21.

As can be seen in FIG. 1, the rich main fuel nozzle 29 and a horizontal portion 241 of the rich low speed fuel passageway 24 of the rich set carburetor 3 have a head $H_1$ with respect to the fuel level in the float chamber 20, with $H_1 > H$.

The operation of the carburetor assembly constructed as aforementioned will now be described. If the primary throttle valve 21 is opened to operate the engine, the rich throttle valve 25 will be opened through the rod 33, causing fuel charges to be ejected through the primary main fuel nozzle 12 and rich main fuel nozzle 29 and supplied to the engine. (It will be needless to mention here that the low speed systems of the primary side and the rich side have already been rendered operative by this time). As the degree of opening of the primary throttle valve 21 increases, the secondary throttle valve 22 begins to open and fuel charges are supplied through the step passageway 19 and secondary main fuel passageway 15, thereby rendering the secondary side 5 operative.

Supposing that the motor vehicle takes a short turn or decelerates or accelerates suddenly, the fuel level in the float chamber 20 will be inclined as indicated by lines C-C' and D-D' with respect to the center of inclination O. This would cause variations in the proportions of fuel and air of the lean mixtures supplied to the main combustion chamber section if the motor vehicle were provided with a carburetor assembly of the prior art. However, according to the invention, the float chamber 20, is arranged substantially in the center of the lean set carburetor 2. This arrangement enables minimization of the influences exerted by the inclined fuel level on the primary and secondary main fuel nozzles 12 and 16. That is, since the primary and secondary main fuel nozzles 12 and 16 are disposed nearest to the center of inclination O of the float chamber 20, the inclined fuel level in the float chamber 20 has the least effect thereon.

This enables mixtures of proper proportions of fuel and air to be supplied to the main combustion chamber section which plays an important role in reducing the amounts of noxious components of the exhausts vented from the engine as a whole, in spite of the inclined fuel level.

On the other hand, in the rich set carburetor 3, the rich main fuel nozzle 29 and the horizontal portion 241 of the rich low speed fuel passageway 24 are disposed at a higher level than the primary and secondary main fuel nozzles 12 and 16. This arrangement minimizes the influences of the inclined fuel level which may, for example, bring the fuel level to the line D-D', so that no excess fuel will be supplied from the rich main fuel nozzle 29 and rich low speed fuel passageway 24. Thus mixtures of proper proportions of fuel and air are supplied to the auxiliary combustion chamber section, so that there will be no trouble of the ignition plug getting wet by the fuel and the mixture in the auxiliary combustion chamber section can be ignited positively.

From the foregoing description, it will be appreciated that, in this embodiment of the invention, the influences exerted by the inclined fuel level in the float chamber on the lean set carburetor and the rich set carburetor can be minimized. This enables mixtures of proper proportions of fuel and air to be supplied to the main and auxiliary combustion chamber sections and consequently to obtain good exhaust emission characteristics.

Meanwhile, in case no rich low speed fuel passageway is provided to the rich set carburetor, the rich main fuel nozzle only is arranged at a higher level than the main fuel nozzles of the lean set carburetor.

Figure 3:
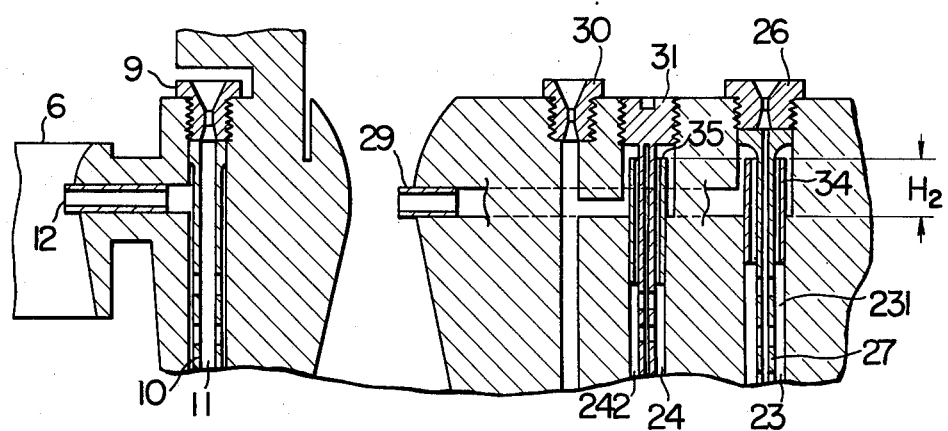
FIG. 3 is a vertical sectional view of the essential portions of the carburetor assembly comprising a second embodiment of the invention.

A second embodiment of the invention shown in FIG. 3 will now be described. In the embodiment shown in FIG. 3, portions of the rich main fuel passageway 23 and a rich low speed fuel passageway 24 are disposed at a higher level than the main fuel nozzles 12 and 16 of the lean set carburetor 2 to eliminate the influences which would be exerted by the inclined fuel level on the supply of fuel-air mixtures to the engine. More specifically, a pipe 34 is fitted in a vertical portion 231 of the rich main fuel passageway 23 and a pipe 35 is fitted in a vertical portion 242 of the low speed fuel passageway 24 in such a manner that upper ends of the pipes 34 and 25 have a head of $H_2$ with respect to the primary main fuel nozzle 12. By this arrangement, the performance of the motor vehicle when it tilts can be increased by the head $H_2$ even if the fuel level is inclined as shown in FIG. 1. Thus tilting of the motor vehicle will cause no excess fuel flow, and mixtures of proper proportions of fuel and air can be supplied to the auxiliary combustion chamber.

From the foregoing description, it will be appreciated that the present invention minimizes the influences of the inclined fuel level in the float chamber on the lean set carburetor and the rich set carburetor, so that it is possible to obtain good exhaust emission characteristics. The invention has been described with reference to embodiments thereof in which the invention has applications in an internal combustion engine of the torch ignition type as one form of internal combustion engines of the stratified charge combustion type. It is to be understood, of course, that the invention can have application in other types of internal combustion engines of the stratified charge combustion type.

What is claimed is:

1. A carburetor assembly for stratified charge combustion type engines comprising a lean set carburetor consisting of a primary side carburetor and a secondary side carburetor each having a main fuel nozzle for supplying lean fuel-air mixtures to an engine combustion chamber; a rich set carburetor having a main fuel nozzle for supplying rich fuel-air mixtures to said engine combustion chamber, said rich set carburetor being disposed adjacent said primary side carburetor of said lean set carburetor and formed integrally therewith; said primary side carburetor, said secondary side carburetor and said rich set carburetor being arranged such that a substantially straight line connects together the center of an inlet bore of each carburetor as seen from above; and a float chamber for supplying fuel to said rich set carburetor and said lean set carburetor, said float chamber being arranged such that the center of its inclination is disposed in the vicinity of the center line between the main fuel nozzles of said primary side carburetor and said secondary side carburetor, and an open end of the main fuel nozzle of said rich set carburetor being disposed at a level higher than open ends of the main fuel nozzles of said primary side carburetor and said secondary side carburetor of said lean set carburetor.

2. A carburetor assembly as claimed in claim 2, wherein a low speed fuel system is provided in said rich set carburetor and has a portion disposed at a level higher than the open ends of the main fuel nozzles of said lean set carburetor.

3. A carburetor assembly comprising a lean set carburetor for supplying lean fuel-air mixtures to an engine, a rich set carburetor supplying rich fuel-air mixtures to the engine, and a float chamber for supplying fuel charges to said lean set carburetor and said rich set carburetor, said lean set carburetor comprising a primary side carburetor and a secondary side carburetor, said primary side carburetor comprising a primary side low speed system and a primary side main fuel system including a primary main fuel nozzle, said secondary side carburetor comprising a secondary side low speed system and a secondary side main fuel system including a secondary side main fuel nozzle, said rich set carburetor being disposed adjacent said primary side carburetor and formed integrally therewith, said rich set carburetor comprising a rich main fuel system including a rich main fuel nozzle and a rich low speed fuel system, an open end of said rich main fuel nozzle and a portion of said rich low speed fuel system being disposed at a higher level than open ends of the primary side main fuel nozzle and the secondary side main fuel nozzle, said float chamber being arranged such that the center of its inclination is disposed substantially on the center line between the primary side main fuel nozzle and the secondary side main fuel nozzle, and the primary side carburetor, the secondary side carburetor, and the rich set carburetor are arranged such that a straight line connects together the center of an inlet of the bore of each carburetor as seen from above.

* * * * *